April 7, 1936.  H. J. WILLS  2,036,246
GEAR LAPPING MACHINE
Filed Feb. 15, 1930
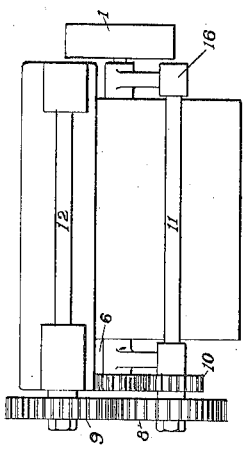
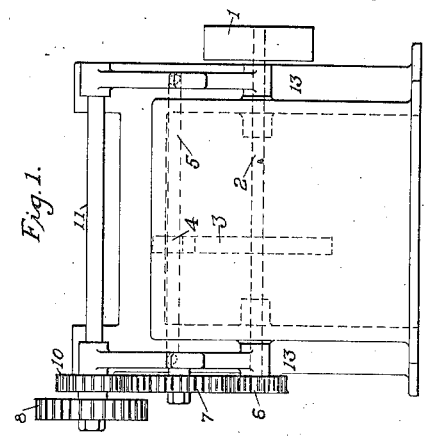
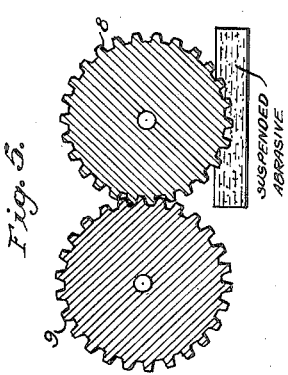
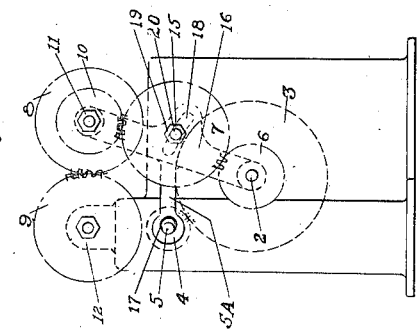
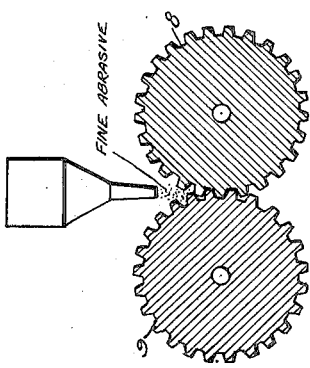
INVENTOR
Herbert J. Wills
BY Thomas C. MacKay
ATTORNEY Patented Apr. 7, 1936

2,036,246

UNITED STATES PATENT OFFICE 2,036,246

GEAR LAPPING MACHINE

Herbert J. Wills, Niagara Falls, N. Y., assignor to The Carborundum Company, Niagara Falls, N. Y., a corporation of Pennsylvania Application February 15, 1930, Serial No. 428,753

5 Claims. (Cl. 51—26)

This invention relates to methods of lapping pairs of gears simultaneously and to apparatus for accomplishing the same in an improved manner. The particular advantage in my device for lapping such gears is the provision of means for reciprocating a pair of gears to be lapped in radial directions slightly toward and away from each other at the same time that they are turning in mesh with each other. This improvement results in a more even lapping action than when the axes of rotation of the gears are stationary with respect to each other.

My improvement is illustrated by the accompanying drawing in which:

Figure 1 is a side elevation of my gear lapping device; Figure 2 is an end elevation of the same; Figure 3 is a plan view of the same; Figure 4 is a detail section showing means for supplying finely divided abrasive to the gears to be lapped; and Figure 5 is a similar view illustrating another method of applying finely divided abrasive to the gears to be lapped.

Referring to the drawing in detail, a driving pulley 1 is keyed on a shaft 2 to which a gear 3 is also keyed. The shaft 2 is mounted in bearings in two standards 13 which are supported on a common base as shown in Figures 1 and 2. The gear 3 meshes with a gear 4 which is keyed on a shaft 5 to which an eccentric 17 is also keyed for a purpose to be described. The gear 6 is keyed on the shaft 2 and meshes with an idler gear 7 which also meshes with the gear 10, which last mentioned gear is keyed to the shaft 11. The gear 8 which is to be lapped is mounted on the shaft 11 to turn therewith and meshes with a gear 9 which is mounted to turn on the shaft 12. The gear 9 is also one of the gears to be lapped. The two arms 16 which carry the shaft 11 are rotatably mounted on the shaft 2 and are rigidly interconnected by a brace not shown. The idler gear 7 is mounted on a stub shaft supported in the arm 16 which is nearest to the gear 7.

The eccentric 17 is mounted on shaft 5 to reciprocate the arm 5A which is itself adjustably fastened to the arm 16 by means indicated generally by the reference character 15. This means includes a rod 20 which passes through the arm 5A in such a way as to permit relative rotation between the arm and rod. The rod 20 also passes through the slot 18 and is provided with a shoulder against which the arm 16 may be pressed by means of the nut 19, which nut fixes the position of the rod 20 with respect to the slot 18.

Abrasive material in finely divided form may be supplied to the gears 8 and 9 by means of a funnel whose outlet is placed above the place of engagement of the gears as indicated in Figure 4. Abrasive may also be supplied from trough (as indicated in Figure 5) through which the lower portion of one of the intermeshing gears 8 or 9 passes.

The operation of the device described is briefly as follows:

A source of power not shown drives the pulley wheel 1 which drives in turn the shaft 2. This shaft drives the gears to be lapped by means of the train of gears 6, 7, 10, the shaft 11, and the gear 8 which drives the gear 9. The same shaft 2 also produces the reciprocating motion of the gears 8 and 9 toward and away from each other although these gears do not pass out of mesh. This reciprocating motion is produced by the train which includes the gears 3 and 4, shaft 5, eccentric 17, eccentric follower 5A, and arms 16 which reciprocate the shaft 11 toward and away from the shaft 12. The shafts 11 and 12 may also support other pairs of gears to be lapped by mutual engagement.

The size of the gears such as 8 and 9 which are to lap each other may be varied by loosening the nut 19, mounting the gears to be lapped on the shafts 11 and 12 respectively, adjusting the position of the arm 16 with respect to the eccentric follower 5A and the eccentric 5 to give the desired reciprocation of the shaft 11 toward the shaft 12, and finally tightening the nut 19. The shaft 11 may thus be adjusted to positions closer to the shaft 12 as the lapping proceeds according to the extent of lapping desired.

An alternative construction for reciprocating the gears 8 and 9 toward and away from each other involves fixing the rod 20, detaching the arm 16 from the shaft 2 so that it is free to rotate about the rod 20, and connecting the cam follower 5A to the lower part of the arm 16 in such a way that the cam follower can impart an oscillatory movement to the arm 16, the arm 16 acting in this case as a lever of the first class.

Additional gears 8 to be lapped may be mounted on the shaft 11 to turn therewith while corresponding additional gears 9 are mounted loosely on the shaft 12 in positions to be driven by their intermeshing gears on shaft 11.

The advantages of my lapping device lie principally in the more thorough lapping of the gears 8 and 9 which results from the relative reciprocating motion of their supporting shafts 11 and 12. By this combination of rotative and reciprocative motions, the gears are lapped one against the other, the tooth profile of one correcting errors in the tooth profile of the other, without destroying or changing said tooth profiles. The adjustment shown generally at 15 not only permits the lapping of gears of different sizes on my device, but also permits the variation of the extent of the lapping as the operation proceeds.

It is understood that many variations in the method of driving the gears to be lapped are possible within the scope of my invention. Other methods of reciprocating the gears 8 and 9 slightly toward and away from each other while they are turning in mesh may also be used within the broad scope of my invention.

I claim:

1. A spur gear lapping device comprising in combination a driving shaft mounted in bearings on a base, a gear keyed to said driving shaft, a frame mounted for oscillation about the axis of the driving shaft, an idler gear mounted for rotation on a shaft in said frame and in mesh with said driving shaft gear, a countershaft for carrying and driving a gear to be lapped, said countershaft being mounted on said oscillatory frame and driven by said idler gear, a third shaft for carrying a second gear to be lapped by engagement with said first gear to be lapped, and means for oscillating said frame at a rapid rate to lap the contacting surfaces of the gears under treatment.

2. The gear lapping device described in claim 1 in which the oscillating means comprises an eccentric mounted for rotation about a fixed axis, an eccentric follower connecting said eccentric and said frame, and means for varying the amplitude of oscillation of the frame comprising an arcuate slot in the frame, a rod loosely mounted in said eccentric follower and passing through said slot, and a clamp to hold the rod in a fixed position with respect to the slot.

3. Apparatus for lapping spur gears comprising a driving shaft, a gear keyed to said driving shaft, a bracket mounted for oscillation about said driving shaft and containing two arms which extend from respective bearings disposed about the driving shaft, a countershaft for carrying and driving a gear to be lapped and for connecting said arms at the ends which lie opposite to the bearings on the driving shaft, an idler gear loosely mounted on one of said arms and in mesh with said driving shaft gear, a gear keyed to said countershaft and in mesh with said idler gear, a third shaft for carrying another gear to be lapped in mesh with the gear to be lapped on the countershaft, said third shaft having a fixed axis, and means including a lever of the third class for oscillating said bracket by predetermined amounts and at predetermined intervals, whereby the gears to be lapped are simultaneously rotated and oscillated with respect to each other.

4. The apparatus for lapping spur gears described in claim 3, in which the countershaft and the third shaft are adapted to carry a plurality of pairs of gears mounted for simultaneous rotation and oscillation in mutual engagement between the gears of each pair.

5. The apparatus for lapping spur gears described in claim 3 in which means are provided for dropping finely divided abrasive on the gears which are being lapped.

HERBERT J. WILLS.